United States Patent
Depraete et al.

(10) Patent No.: US 9,297,448 B1
(45) Date of Patent: Mar. 29, 2016

(54) HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventors: Alexandre Depraete, Bloomfield, MI (US); Michel Bacher, Marseilles (FR); Gyubong Jeon, Troy, MI (US); Zane Yang, Troy, MI (US)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/522,189

(22) Filed: Oct. 23, 2014

(51) Int. Cl.
*F16H 45/02* (2006.01)

(52) U.S. Cl.
CPC ........ *F16H 45/02* (2013.01); *F16H 2045/0205* (2013.01); *F16H 2045/0221* (2013.01); *F16H 2045/0231* (2013.01); *F16H 2045/0278* (2013.01)

(58) Field of Classification Search
CPC ................ F16H 2045/0205; F16H 2045/0231; F16H 2045/0278; F16F 15/13469; F16F 15/13484
USPC ....................................................... 192/3.29
See application file for complete search history.

(56) References Cited

U.S. PATENT DOCUMENTS

| | | | |
|---|---|---|---|
| 2,130,895 A | 9/1938 | Ness | |
| 2,860,747 A | 11/1958 | Kelley | |
| 2,992,713 A | 7/1961 | Stump et al. | |
| 3,041,892 A | 7/1962 | Schjolin | |
| 3,252,352 A | 5/1966 | General et al. | |
| 4,041,701 A | 8/1977 | Goto et al. | |
| 4,143,561 A * | 3/1979 | Melhorn ............... | F16F 15/129 192/214.1 |
| 4,194,604 A * | 3/1980 | Nichols .................. | F16H 45/02 192/3.26 |
| 4,199,047 A * | 4/1980 | Ling ....................... | F16H 45/02 192/3.3 |
| 5,713,442 A | 2/1998 | Murata et al. | |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.

(Continued)

*Primary Examiner* — Richard Lorence
*Assistant Examiner* — David Morris
(74) *Attorney, Agent, or Firm* — Berenato & White, LLC

(57) ABSTRACT

A hydrokinetic torque coupling device includes a casing having opposite sidewalls and an outer wall extending between and connecting the opposite sidewalls, an impeller coaxial aligned with the rotational axis, a piston engagement member extending substantially radially inward from and non-moveable relative to the outer wall of the casing, and a turbine-piston coaxially aligned with and hydrodynamically drivable by the impeller. The turbine-piston includes a turbine-piston shell having a turbine-piston flange with an engagement surface that is movable axially toward and away from an engagement surface of the piston engagement member to position the hydrokinetic torque coupling device into and out of a lockup mode in which the turbine-piston is mechanically locked to and non-rotatable relative to the piston engagement member.

20 Claims, 14 Drawing Sheets

(56) References Cited

U.S. PATENT DOCUMENTS

| | | | |
|---|---|---|---|
| 5,813,505 A | 9/1998 | Olsen et al. | |
| 6,006,877 A * | 12/1999 | Haupt | F16H 45/02 192/113.34 |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 8,276,723 B2 | 10/2012 | Verhoog et al. | |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2011/0011691 A1 * | 1/2011 | Tomiyama | F16H 45/02 192/3.29 |
| 2011/0088992 A1 * | 4/2011 | Lindemann | F16H 45/02 192/30 R |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |

FOREIGN PATENT DOCUMENTS

| | | |
|---|---|---|
| DE | 10226860 A1 | 12/2003 |
| EP | 0125428 A1 | 11/1984 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| JP | 58-131466 A | 8/1983 |
| KR | 101311531 B1 | 9/2013 |
| WO | 2004046574 A1 | 6/2004 |

OTHER PUBLICATIONS

U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Lindemann et al., "iTC—Innovative Solutions for Torque Converters Pave the Way into the Future", Torque Converter 20, pp. 280-301.

* cited by examiner

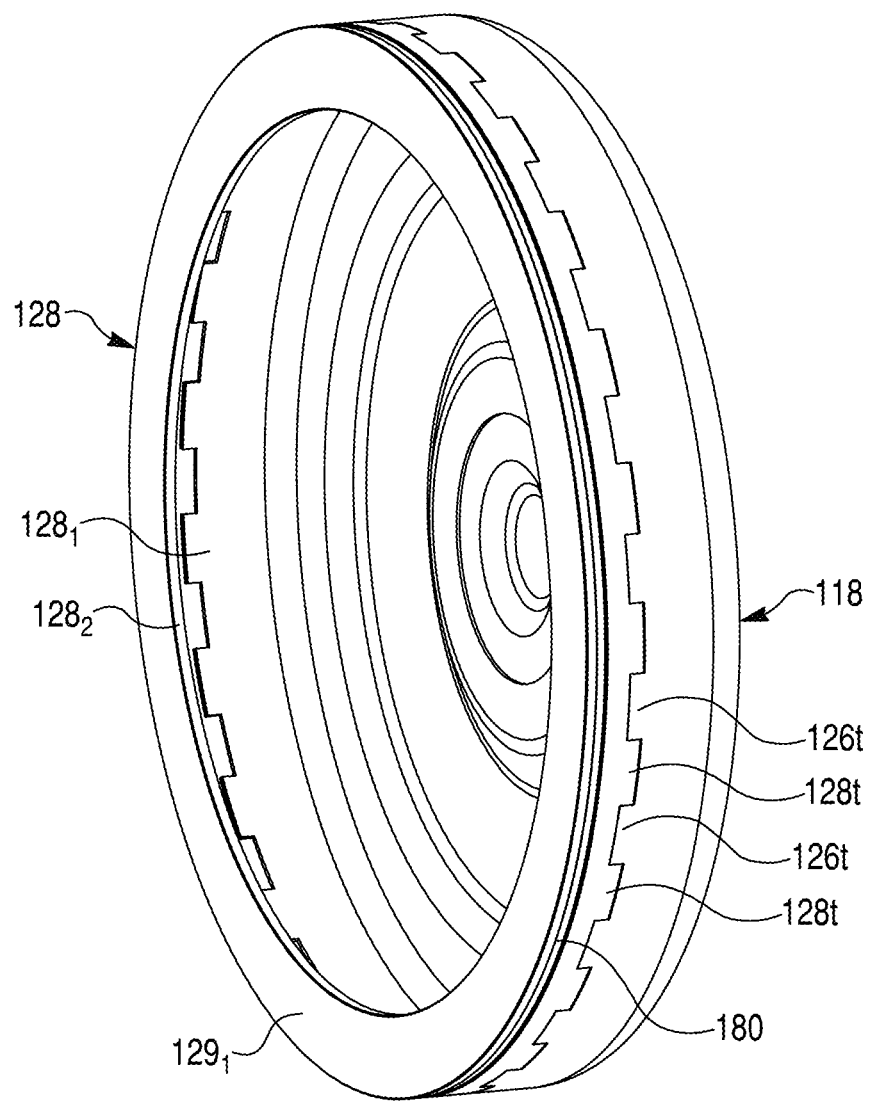

US 9,297,448 B1

HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operation conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive, for example, from reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect includes a casing rotatable about a rotational axis and having opposite first and second sidewalk and an outer wall extending between and interconnecting the opposite sidewall, an impeller coaxially aligned with the rotational axis and including an impeller shell, a piston engagement member extending substantially radially inward from and non-moveable relative to the outer wall of the casing and being spaced between the opposite sidewalls of the casing, the piston engagement member having a first engagement surface, and a turbine-piston coaxially aligned with and hydrodynamically drivable by the impeller. The turbine-piston includes a turbine-piston shell having a turbine-piston flange with a second engagement surface axially movable toward and away from the first engagement surface of the piston engagement member to position the hydrokinetic torque coupling device into and out of a lockup mode in which the turbine-piston is mechanically locked to and non-rotatable relative to the piston engagement member.

According to a second aspect of the invention, there is provided a hydrokinetic torque coupling device for coupling together a driving shaft and a driven shaft. The hydrokinetic torque coupling device of this second aspect includes a casing rotatable about a rotational axis and including opposite first and second casing shells respectively defining first and second sidewalls and an outer wall extending between and connecting the opposite sidewalls, an impeller coaxially aligned with the rotational axis and including an impeller shell, a piston engagement member extending substantially radially inward from and non-rotatable relative to the outer wall of the casing and having a first engagement surface, and a turbine-piston coaxially aligned with and hydrodynamically drivable by the impeller. The casing and the piston engagement member have respective teeth intermeshing with one another. The turbine-piston includes a turbine-piston shell having a turbine-piston flange with a second engagement surface axially movable toward and away from the first engagement surface of the piston engagement member to position the hydrokinetic torque coupling device into and out of a lockup mode in which the turbine-piston is mechanically locked to and non-rotatable relative to the piston engagement member.

According to a third aspect of the invention, a method is provided for assembling a hydrokinetic torque coupling device for coupling a driving shaft and a driven shaft together. The method includes the step of providing a torque converter having a rotational axis. The torque converter includes an impeller and a turbine-piston. The impeller includes an impeller shell. The turbine-piston includes a turbine-piston shell having an axially movable turbine-piston flange. The torque converter is operatively connected to a piston engagement member having a first engagement surface and a casing shell to provide a structure in which (i) the casing shell and the impeller shell respectively define the first and second sidewalls of a casing, the casing including an outer wall interconnecting the first and second sidewalls, (ii) the piston engagement member extends radially inward from and is non-movable relative to the outer wall of the casing, and is spaced between the opposite first and second sidewalls of the casing, and (iii) the turbine-piston flange with a second engagement surface is movable axially toward and away from the first engagement surface of the piston engagement member to position the hydrokinetic torque coupling device into and out of a lockup mode in which the turbine-piston is mechanically locked and non-rotatable relative the to the piston engagement member of the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 10 is a perspective view of the first casing shell assembled with the piston engagement member of the torque coupling device in accordance with the second exemplary embodiment of the present invention;

Figure 1:
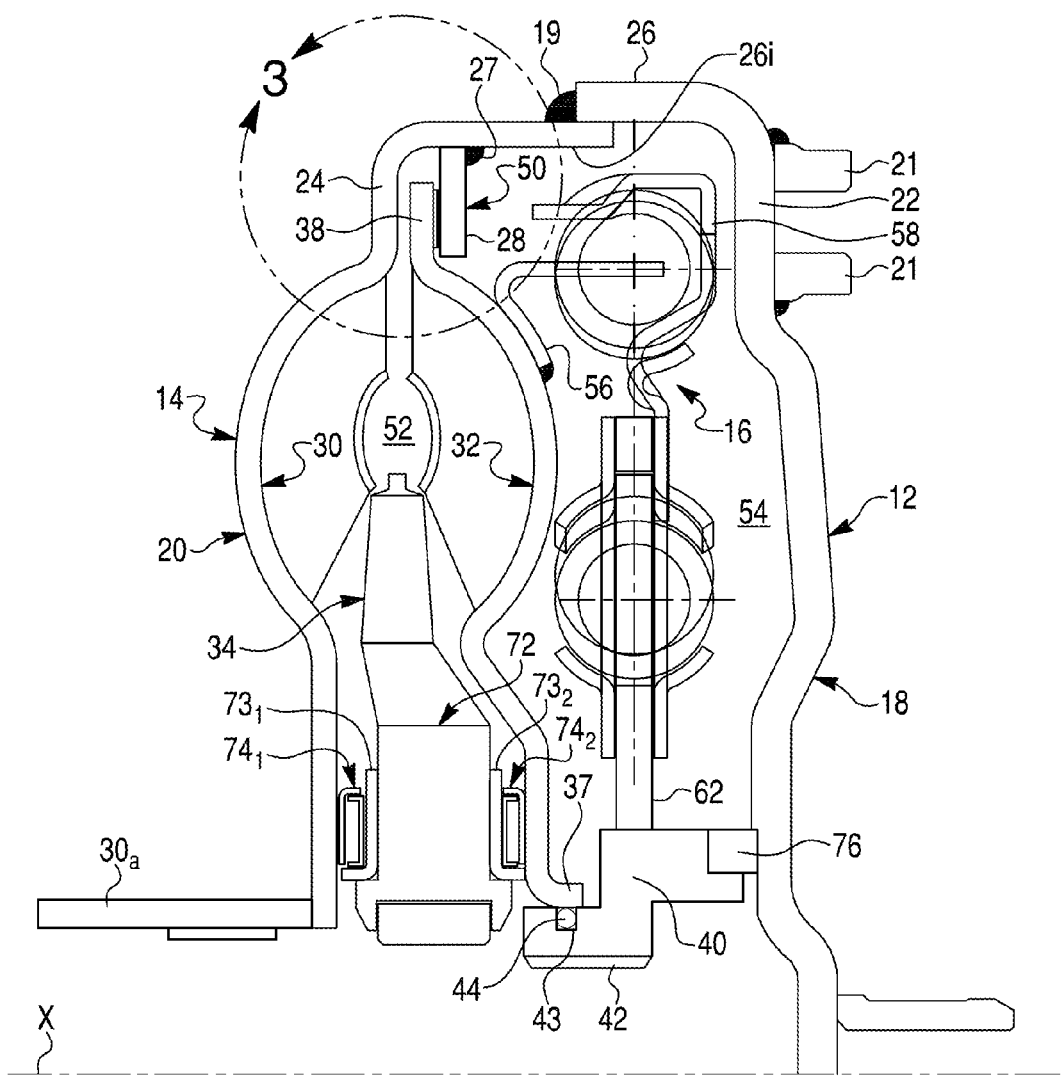
FIG. 1 is a fragmented half-view in axial section of a hydrokinetic torque coupling device in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in FIG. 1 of the accompanying drawings by reference numeral 10. The hydrokinetic torque coupling device 10 is operable to hydrodynamically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14, and a torsional vibration damper (also referred to as a damper assembly) 16 are all rotatable about a rotational axis X. The drawings discussed herein show half-views, that is, the portion or fragment of the hydrokinetic torque coupling device 10 above (as illustrated) rotational axis X. Generally, the device 10 is symmetrical about the rotational axis X. Herein, the axial and radial orientations are considered with respect to the rotational axis X of the hydrokinetic torque coupling device 10. The relative terms such as "axially," "radially," and "circumferentially" are with respect to orientations parallel to, perpendicular to, and around the rotational axis X, respectively. The relative terms such as "radially inwardly" and "radially outwardly" and derivatives thereof are with respect to orientations toward or away from the rotational axis X, respectively.

The sealed casing 12 according to the first exemplary embodiment as illustrated in FIG. 1 includes a first casing shell 18 and a second casing shell 20 non-movably (i.e., fixedly) interconnected sealingly together, such as by welding at weld 19 at their outer peripheries. The first casing shell 18 is non-movably (i.e., fixedly) interconnected to the driving shaft, more typically a flywheel (not shown) that is non-rotatably fixed to the driving shaft, so that the casing 12 rotates at the same speed that the engine operates. Specifically, in the illustrated embodiment of FIG. 1 the casing 12 is rotatably driven by the internal combustion engine and is non-rotatably coupled to the flywheel thereof with studs 21, as best shown in FIG. 1. Each of the first and second casing shells 18, 20 may be made, for example, integrally by press-forming a one-piece metal sheet.

Figure 2:
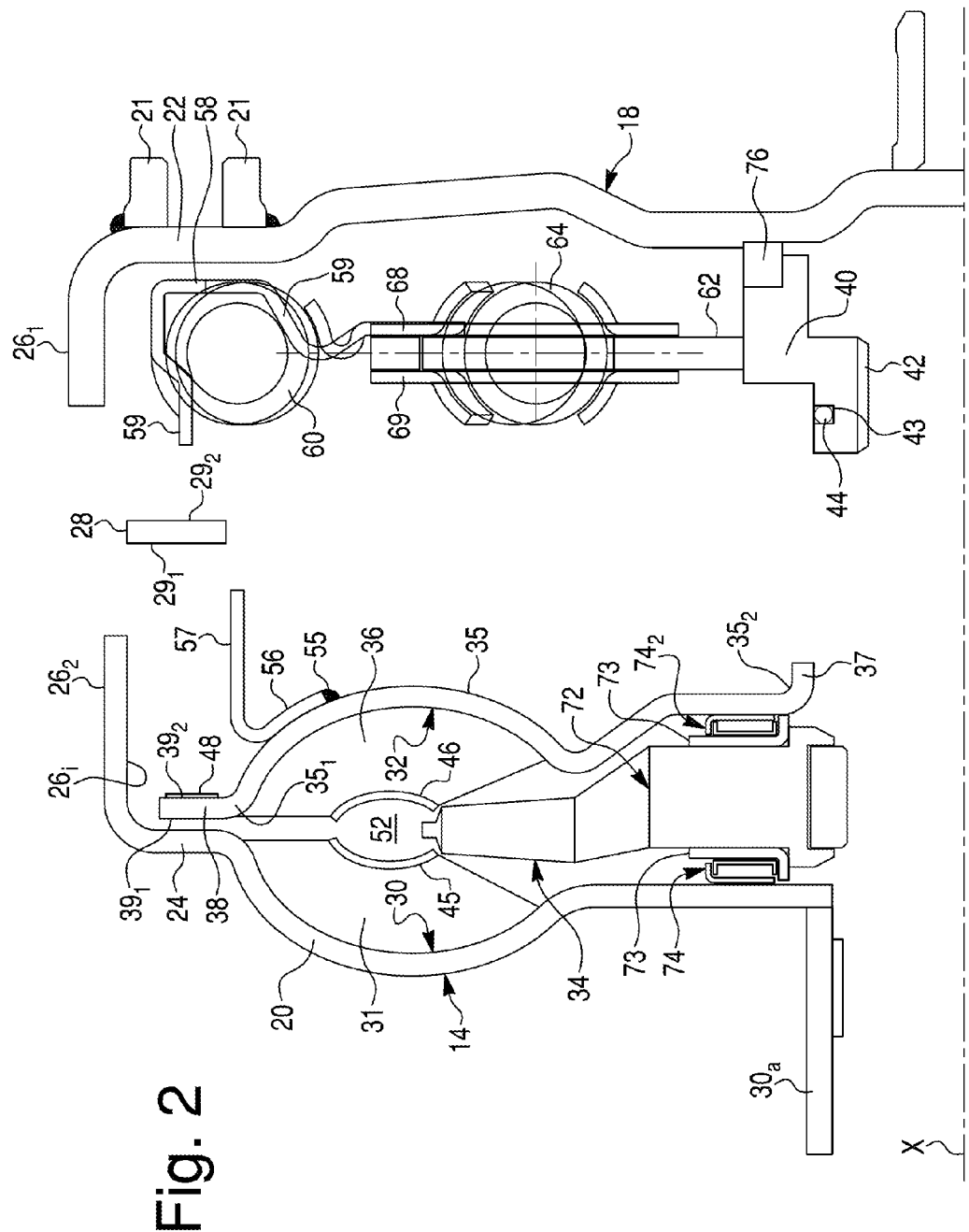
FIG. 2 is an exploded fragmented cross-sectional view of the hydrokinetic torque coupling device of FIG. 1.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18, as best shown in FIG. 2. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

A piston engagement member 28 of the casing 12 in the form of a substantially annular, planar wall that extends radially inward from an inner peripheral surface 26i of the annular outer wall portion $26_2$ of the casing 12. The piston engagement member 28 is non-rotatable relative to the outer wall portion $26_2$. Specifically, in the exemplary embodiment shown in FIG. 1, a weld 27 affixes the radially outer end of the piston engagement member 28 to the outer wall portion $26_2$. The piston engagement member 28 is axially spaced between the first and second sidewall portions 22 and 24 of the casing 12, with the piston engagement member 28 being placed in closer proximity to the second sidewall portion 24 than to the first sidewall portion 22. As best shown in FIG. 2, the piston engagement member 28 includes a first engagement surface $29_1$ and a second surface $29_2$ opposite to the first engagement surface $29_1$.

The torque converter 14 includes an impeller (sometimes referred to as the pump or impeller wheel) 30, a turbine-piston 32, and a stator (sometimes referred to as the reactor) 34 situated axially between the impeller 30 and the turbine-piston 32. The impeller 30, the turbine-piston 32, and the stator 34 are coaxially aligned with one another relative to the rotational axis X. The impeller 30, the turbine-piston 32, and the stator 34 collectively form a torus. The impeller 30 and the turbine-piston 32 may be fluidly coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes a core ring 45, and a plurality of impeller blades 31 fixedly attached, such as by brazing, to the impeller shell 20 and the core ring 45. The impeller 30, including its shell 20, the core ring 45, and the impeller blades 31, is non-moveably (i.e., fixedly) secured to the casing 12 and hence to the drive shaft (or flywheel) of the engine and rotate at the same speed as the engine output. The impeller 30 also includes an impeller hub 30a fixedly secured to the impeller shell 20. The impeller hub 30a is arranged for engagement with a hydraulic pump of the transmission.

The torque coupling device 10 further includes an output hub 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35. The impeller shell 20 and the turbine-piston shell 35 collectively define a substantially toroidal inner chamber (or torus chamber) 52 therebetween.

Extending axially at a radially inner peripheral end $35_2$ of the turbine-piston shell 35 is a substantially cylindrical flange 37 that is proximate to the rotational axis X, as best shown in FIG. 1. The substantially cylindrical flange 37 of the turbine-piston 32 is rotatable relative to the output hub 40. The sealing member(e.g., O-ring) 44 creates a seal at the interface of the substantially cylindrical flange 37 and the output hub 40. As discussed in further detail below, the turbine-piston 32 is axially movably relative to the output hub 40 along this interface.

The piston component of the turbine-piston 32 includes a substantially annular, planar (i.e., flat) turbine-piston flange (or turbine-piston wall) 38 formed integrally with the turbine-piston shell 35. The turbine-piston flange 38 is distal to the rotational axis X relative to the above-discussed proximal flange 37. The turbine-piston flange 38 is a radial extension of the turbine-piston shell 35 and, as illustrated in FIG. 1, is situated radially outside of the turbine blades 36. The turbine-piston flange 38 and the turbine-piston shell 35 are illustrated integral with one another, e.g., made of a single or unitary component, but may be separate pieces or components connected together. The turbine-piston flange 38 extends from a radially outer peripheral end $35_1$ of the turbine-piston shell 35 radially outward to terminate at an end in spaced relationship to the inner peripheral surface 26i of the annular outer wall 26 of the casing 12. As best shown in FIG. 1, the turbine-piston flange 38 is axially interposed between and extends radially outward into a gap between the second sidewall portion 24 of the casing 12 and the first engagement surface $29_1$ of the piston engagement member 28.

Returning to FIG. 2, the turbine-piston flange 38 has a first surface $39_1$ facing the second sidewall portion 24 and an opposite second engagement surface $39_2$ facing the piston engagement member 28. The first and second engagement surfaces $29_1$ and $39_2$ are parallel to and face one another, and extend radially at a 90° angle relative to the rotational axis X. The second engagement surface $39_2$ is movable axially towards and away from the first engagement surface $29_1$ to position the coupling device 10 into and out of a lockup mode, respectively. Alternatively, the first and second engagement surfaces $29_1$ and $39_2$ may extend radially at an oblique angle, i.e., other than 90° relative to the rotational axis X, although the surfaces $29_1$ and $39_2$ desirably remain parallel to and facing one another.

In accordance with the first exemplary embodiment, the second engagement surface $39_2$ is provided with a friction ring (or friction lining) 48, best shown in FIG. 2. The friction ring 48 is made of a friction material for improved frictional performance. The friction ring 48 may be secured to the second engagement surface $39_2$, for example, by adhesive bonding and/or with fasteners. Alternatively, a friction ring (or friction lining) may be secured to the first engagement surface $29_1$. According to still another embodiment, a first friction ring or liner is secured to the first engagement surface $29_1$ of the piston engagement member 28 and a second friction ring or liner is secured to the second engagement surface $39_2$. It is within the scope of the invention to omit one or both of the friction rings.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A first thrust bearing $74_1$ is interposed between a first side bearing ring $73_1$ of the stator 34 and the impeller shell 20 of the casing 12, while a second thrust bearing $74_2$ is interposed between a second side bearing ring $73_2$ of the stator 74 and the turbine-piston shell 35.

In the lockup mode, the first and second engagement surfaces $29_1$ and $39_2$ (optionally including the friction ring(s) 48 secured thereto) are pressed together such that the turbine-piston flange 38 is frictionally non-rotatably coupled to the piston engagement member 28, thereby mechanically locking the turbine-piston 32 to the casing 12 in the lockup mode so that the turbine-piston 32 and casing 12 are non-rotatable relative to one another. When not in the lockup mode, the first and second engagement surfaces $29_1$ and $39_2$ are spaced from one another, such that the turbine-piston flange 38 is not frictionally non-rotatably coupled to the piston engagement member 28 and the casing 12. In the non-lockup mode, normal operation of the torque converter 14 selectively hydrodynamically couples and decouples the impeller 30 to and from the turbine-piston 32.

The torsional vibration damper 16 is housed in the casing 12 axially between, on one side, the turbine-piston 32 and the piston engagement member 28, and on the other side the first casing shell 18, as best shown in FIG. 1. The torsional vibration damper 16 is connected to a drive (or input) member 56 (discussed below). The torsional vibration damper 16 includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are situated radially outward relative to the second circumferential damping members 64. According to the exemplary embodiment of FIG. 1 and other embodiments discussed herein, the first and second damping members 60, 64 are configured as helical (or coil) springs oriented substantially circumferentially about the rotational axis X. Other elastic members may be selected to replace or supplement the springs.

The drive member 56 is fixedly connected to the turbine-piston shell 35 of the turbine-piston 32, such as by weld 55, which may be a continuous weld bead. The output side of the drive member 56 has a plurality of driving tabs 57 (FIG. 2) extending axially away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35. As discussed in greater detail below, when the turbine-piston 32 shifts axially due to a lockup event, the driving tabs 57 move axially relative to the driven tabs 59. Thus, the drive member 56 is both axially and circumferentially movable relative to the intermediate member 58, and generally to the damping assembly 16.

The radially inner portion of the intermediate member 58 is connected to or forms a first disk part 68 on a first side of the second damping members 64. The first disk part 68 is non-moveably secured to a second disk part 69 on the opposite side of the second damping members 64, such as by rivets. The first and second disk parts 68, 69 establish an input part to the second damping members 64.

The driver member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is non-rotatably connected, e.g., fixed, to the output hub 40. The non-rotatable connection between the driven member 62 and the output hub 40 may be formed by splines or welding. Alternatively, the output hub 40 and driven member 62 may be integral with one another. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential across opposite sides of the turbine-piston shell 35. Referring to FIG. 1, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston flange 38 axially in the direction of torque transmission, i.e., towards the output side of the casing 12, that is right to left in FIG. 1, away from lockup mode. On the other hand, a pressure decrease in the damper chamber 54 relative to the torus chamber 52 (or stated differently a pressure increase in the torus chamber 52 relative to the damper chamber 54) shifts the turbine-piston flange 38 axially against the direction of torque transmission, i.e., towards the input side of the casing, that is left to right in FIG. 1, into lockup mode.

In the lockup mode, the turbine-piston shell 35 is displaced axially away from the impeller 30 until the frictional ring 48 of the second engagement surface $39_2$ of the turbine-piston flange 38 abuts against and is non-rotatably frictionally coupled to the first engagement surface $29_1$. Torque is transferred from the engine to the casing 12, then by way of the frictional engagement between surfaces $29_1$ and $39_2$ or frictional lining 48 thereof) to the locked-up piston engagement member 28 and turbine-piston 32, then serially to the drive member 56, the damping assembly 16 and the output hub 40. Thereby, the lockup clutch 50 bypasses the hydrodynamic fluid coupling of the torque converter 14 and mechanically couples the driving and driven shafts. Moreover, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid and creating a very high pressure difference between the torus and damper chambers 52, 54.

In the non-lockup mode, the turbine-piston 32 is displaced axially towards the impeller 30, axially moving the turbine-piston flange 38 until the frictional ring 48 of the second engagement surface $39_2$ is spaced from and no longer non-rotatably frictionally coupled to the first engagement surface $29_1$. Thus, torque transferred from the engine to the casing 12 does not bypass the torque converter 14 through the lockup clutch 50. The torque is transferred serially from the casing 12, including the impeller shell 20, through the hydrodynamic coupling of the torque converter 14, to the drive member 56 and its driving tabs 57, to the damping assembly 16, and to the output hub 40. Notably, in the non-lockup position an open serpentine passage is established between the second sidewall portion 24, the turbine-piston flange 38, and the piston engagement member 28, allowing hydraulic fluid to flow between the torus chamber 52 and the damper chamber 54 through the serpentine passage.

Torque is transmitted through the torsional vibration damper 16 to the output hub 40, which is connected to the driven shaft, for example by splines 42. As the turbine-piston 32 moves axially into lockup position as described above, the driving tabs 57 of the drive member 56 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 is axially displaced by pressure difference in the torus chamber 52 and the damper chamber 54 into and out of lockup mode.

In operation, the lockup clutch 50 is generally activated after the hydraulic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring (e.g, washer spring), may be included in the hydrokinetic torque coupling device 10 to urge the turbine-piston 32 into or out of lockup mode.

The turbine-piston 32 forms both the shell component of the turbine and the piston component of the lockup clutch 50, as described above. By consolidating two components that are normally separate from one another into a single component, space is saved in the hydrokinetic torque coupling device 10. This space-saving structure provides several design advantages. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment, including but not limited to the additional embodiments shown in FIGS. 4-13. In the interest of brevity, reference characters in FIGS. 4-13 that are described above in connection with FIGS. 1-3 are not further elaborated upon below, except to the extent necessary or useful to explain the additional embodiments of FIGS. 4-13. Modified components and parts are indicated by the addition of a hundred digits to the reference numerals of the components or parts.

In a hydrokinetic torque coupling device 110 of a second exemplary embodiment illustrated in FIGS. 4-10, the annular piston engagement member 28 is replaced by an annular piston engagement member 128 with an L-shaped cross-section. In the second exemplary embodiment of the present invention illustrated in FIGS. 4-10, particularly FIGS. 5 and 6, the piston engagement member 128 includes an axially extending tubular (or cylindrical) support portion $128_1$ and an annular flange portion $128_2$ formed integrally with and extending substantially radially inwardly from the tubular support portion $128_1$. Specifically, the support portion $128_1$ and the flange portion $128_2$ of the piston engagement member 128 are preferably integrally formed with one another, e.g., made of a single or unitary piece, but alternatively may be separate pieces connected together. The flange portion $128_2$ of the piston engagement member 128 includes a first engagement surface $129_1$ and a second surface $129_2$ opposite to the first engagement surface $129_1$. The support portion $128_1$ has axially opposite first and second ends 128a and 128b. Accordingly, the flange portion $128_2$ of the piston engagement member 128 extends radially inwardly from the second end 128b of the tubular support portion $128_1$ of the piston engagement member 128.

Figure 4:
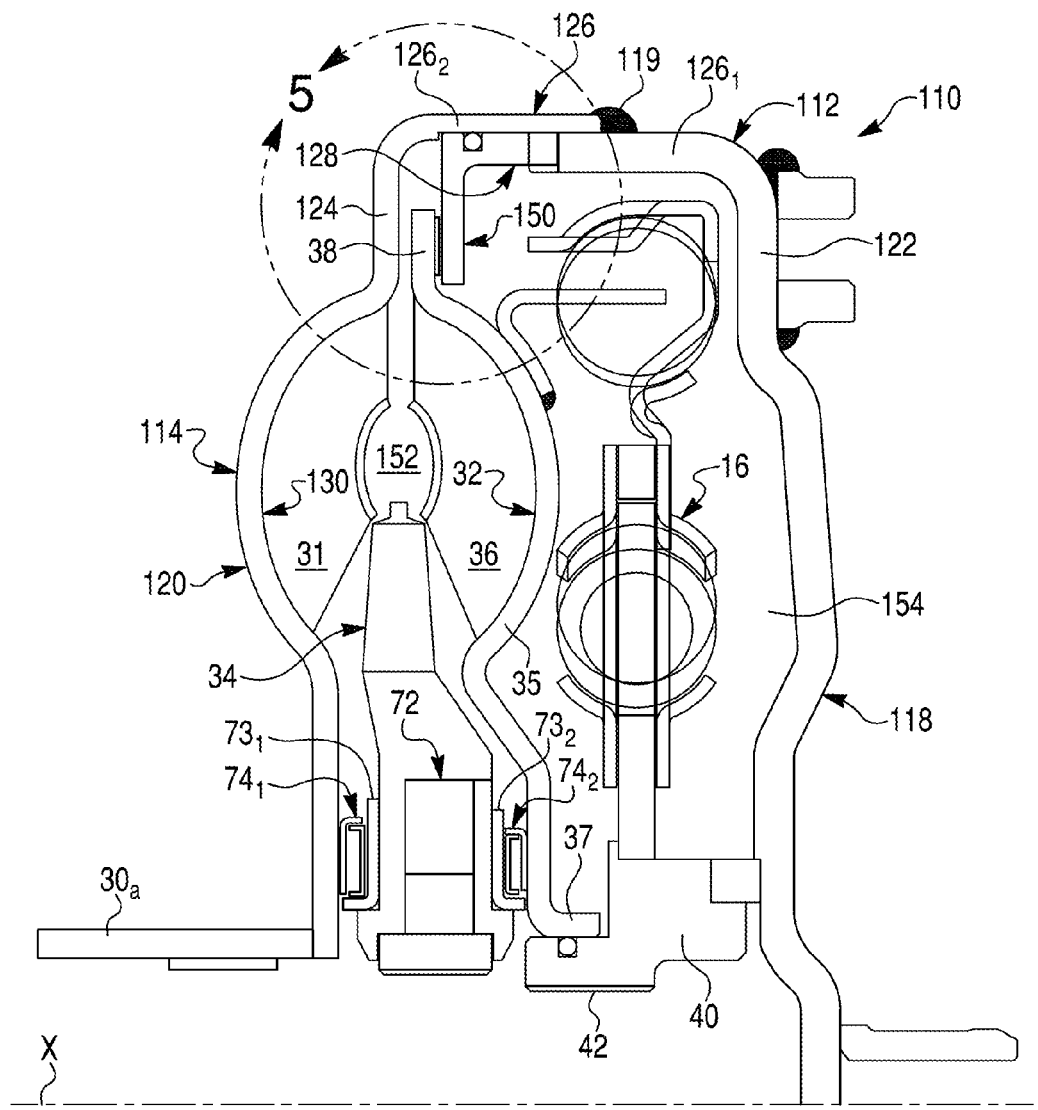
FIG. 4 is a fragmented half-view in axial section of a hydrokinetic torque coupling device in accordance with a second exemplary embodiment of the present invention.
Figure 5:
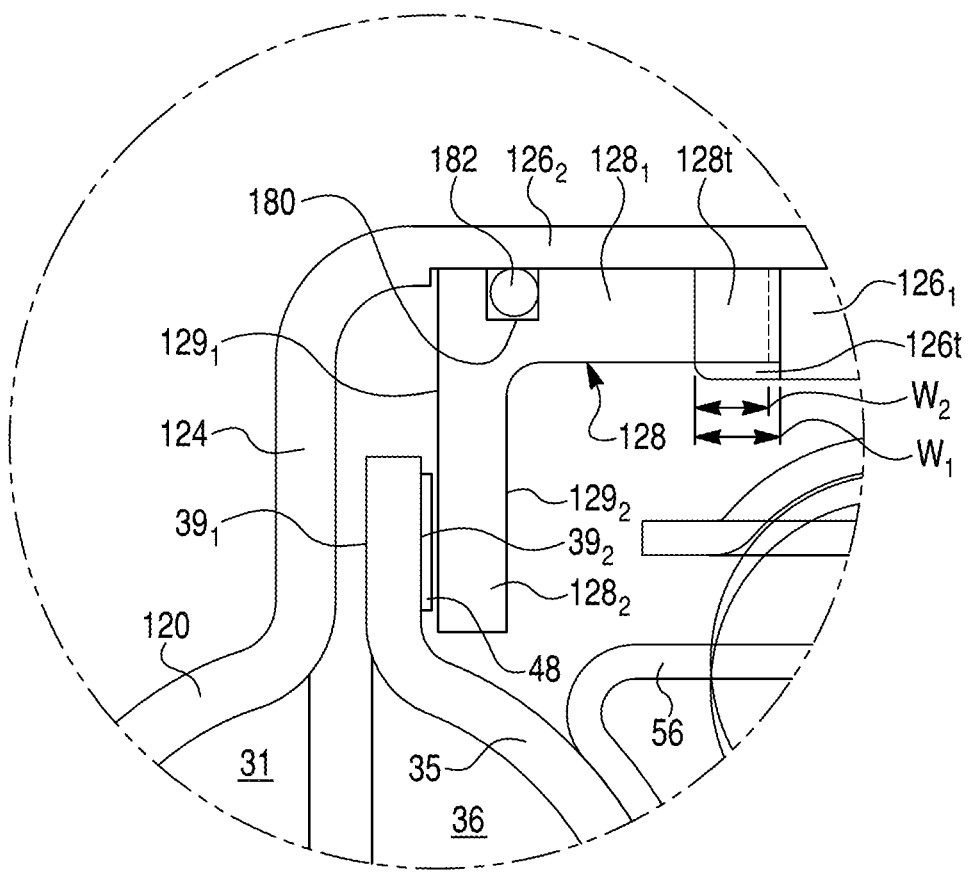
FIG. 5 is an enlarged view of a fragment of the hydrokinetic torque coupling device shown in the circle "5" of FIG. 4.
Figure 6:
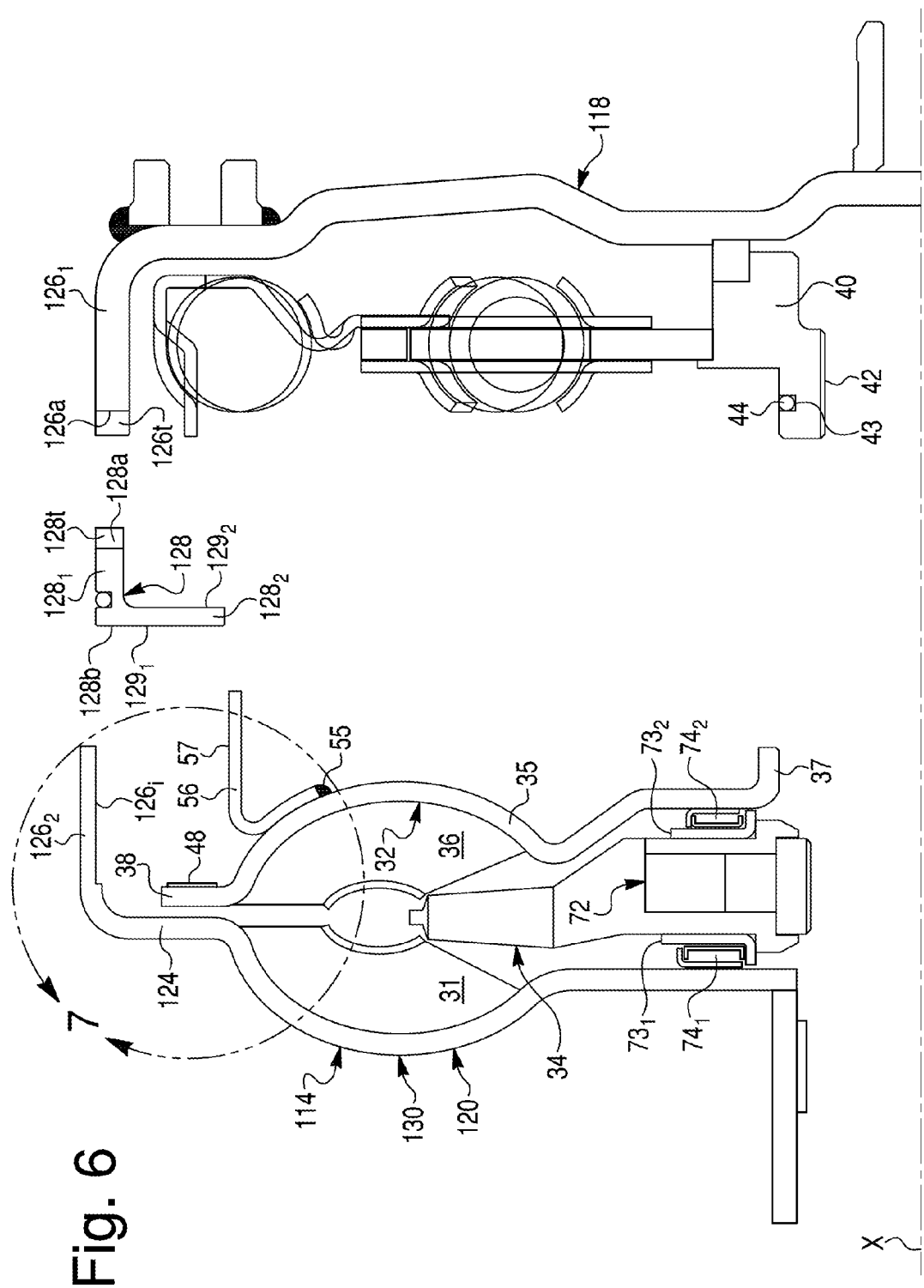
FIG. 6 is an exploded fragmented cross-sectional view of the hydrokinetic torque coupling device of FIG. 4.
Figure 9:
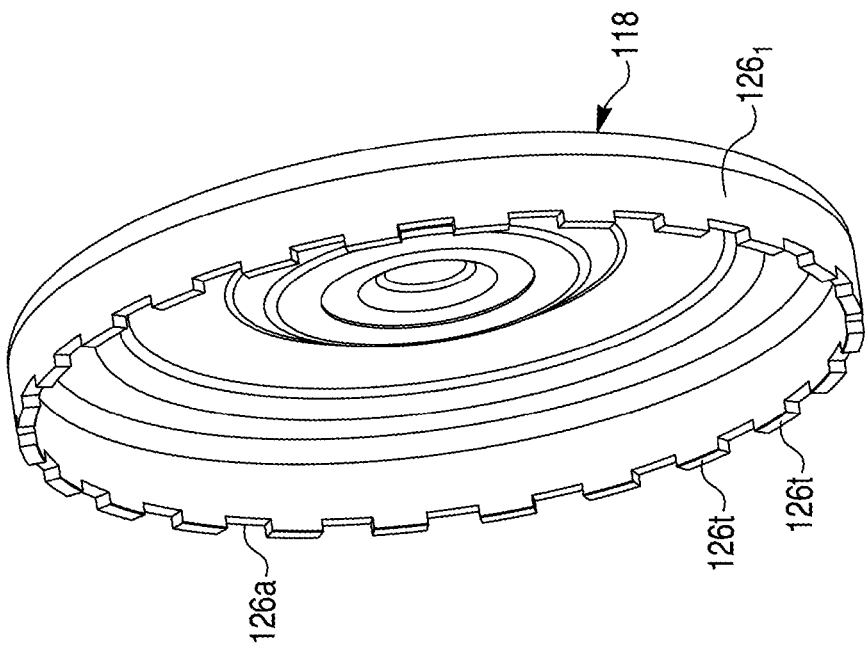
FIG. 9 is a perspective view of a first casing shell of the torque coupling device in accordance with the second exemplary embodiment of the present invention
Figure 8:
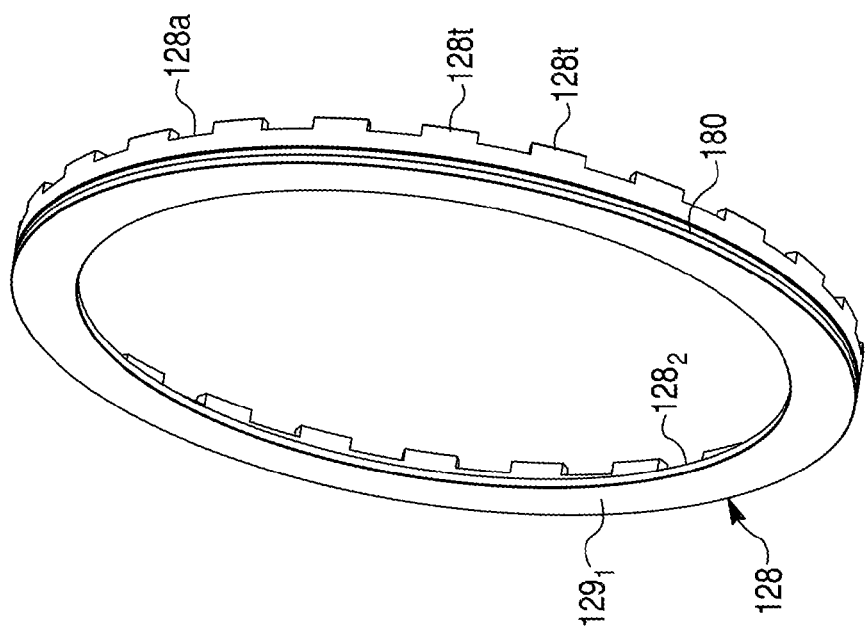
FIG. 8 is a perspective view of a piston engagement member of the torque coupling device in accordance with the second exemplary embodiment of the present invention.

The piston engagement member 128 is mounted to a casing 112 so as to non-rotatably engage a first casing shell 118 of a casing 112. Specifically, the first axial end 128a of the support portion $128_1$ of the piston engagement member 128 is formed with one or more axially extending teeth 128t, as best shown in FIGS. 5, 6 and 8. Similarly, a first axial end 126a of a first outer wall portion $126_1$ of the first casing shell 118 is formed with one or more teeth 126t, which are complementary to and face the teeth 128t of the piston engagement member 128, as best shown in FIGS. 5, 6 and 9. In an assembled state, best shown in FIGS. 4, 5 and 10, the teeth 128t of the piston engagement member 128 intermesh with the teeth 126t of the casing 112 so that the flange portion $128_2$ of the piston engagement member 128 is non-rotatably mounted to the casing 112. In other words, the piston engagement member 128 is splined with or keyed to the casing 112 so as to be non-rotatable relative to the casing 112. An axial length $w_1$ of the teeth 126t of the casing 112 is longer than an axial length $w_2$ of the teeth 128t of the piston engagement member 128, as best shown in FIG. 5.

Figure 7:
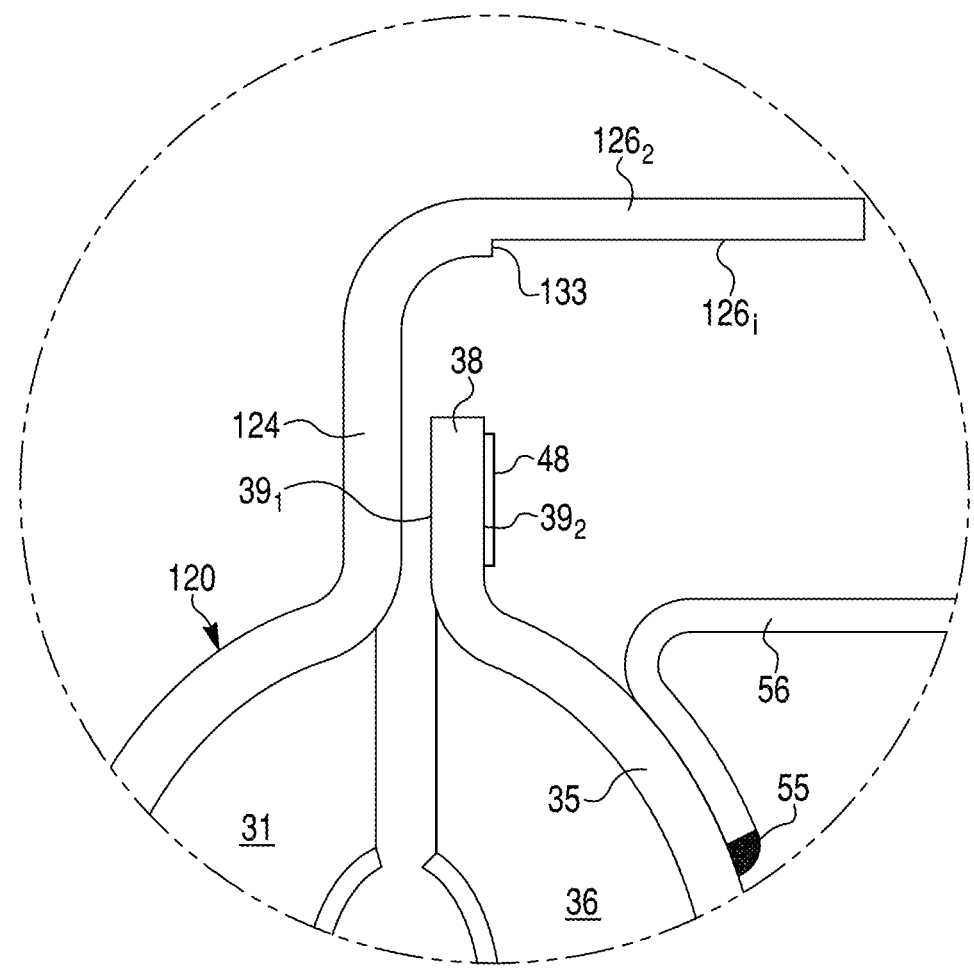
FIG. 7 is an enlarged view of a fragment of the hydrokinetic torque coupling device shown in the circle "7" of FIG. 6.

Furthermore, the piston engagement member 128 is axially secured to the casing 112 to ensure engagement of a lockup clutch 150. In order to retain the first engagement surface $129_1$ of the piston engagement member 128 facing a turbine-piston flange 38 of a turbine-piston 32, an inner peripheral surface 126i of an annular outer wall 126 of the casing 12 is provided with an axial stop member 133 in the form of a substantially annular, planar shoulder, so that the inner peripheral surface 126i of the annular outer wall portion 126 has a radially extending step, as best shown in FIG. 7. As further illustrated in FIGS. 4 and 5, a second axial end 128b of the support portion $128_1$ of the piston engagement member 128 axially abuts (juxtaposed to) the stop member 133 of the casing 112. Thus, the piston engagement member 128 with the first engagement surface $129_1$ is mounted non-rotatably and axially non-moveably relative to the casing 112, as best shown in FIGS. 4 and 5.

As best shown in FIG. 5, a radially outer surface of the support portion $128_1$ of the piston engagement member 128 includes an annular slot 180 for receiving a sealing member, such as an O-ring 182. The sealing member (e.g., O-ring) 182 creates a seal at the interface of the casing 112 and the piston engagement member 128.

The above arrangements and connections, particularly the intermeshing teeth 126t, 128t, allow the piston engagement member 128 to be attached non-rotatably relative to the casing 112 without direct bonding, welding, of fastening of the piston engagement member 128 to the first or second outer wall portions $126_1$, $126_2$ within the interior volume of the casing 112. Further, the stop member 133 of the casing 112 assists in axially positioning the piston engagement member 128 during assembly. These features greatly simplify assembly of the hydrokinetic torque coupling device 110 and help ensure proper engagement of lockup clutch 150.

Figure 11:
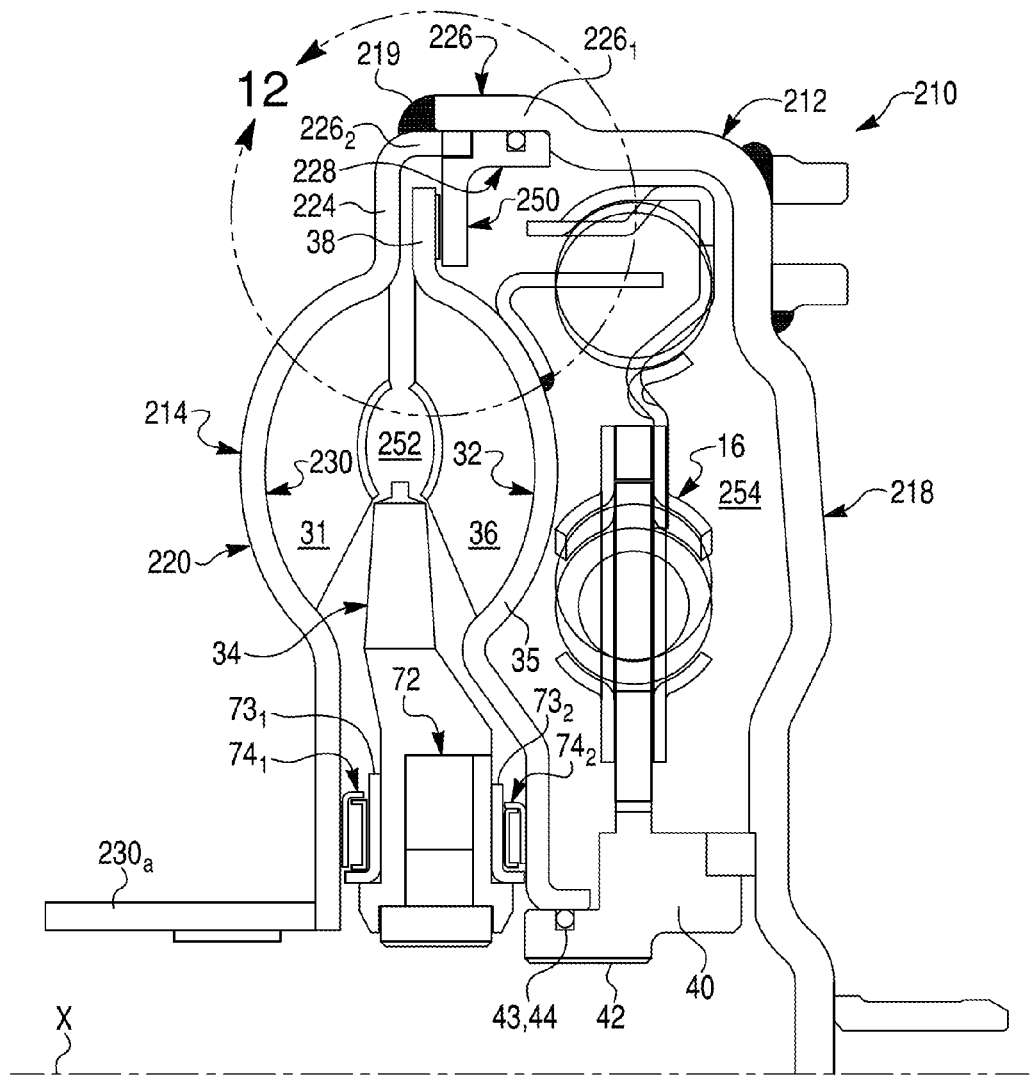
FIG. 11 is a fragmented half-view in axial section of a hydrokinetic torque coupling device in accordance with a third exemplary embodiment of the present invention.
Figure 12:
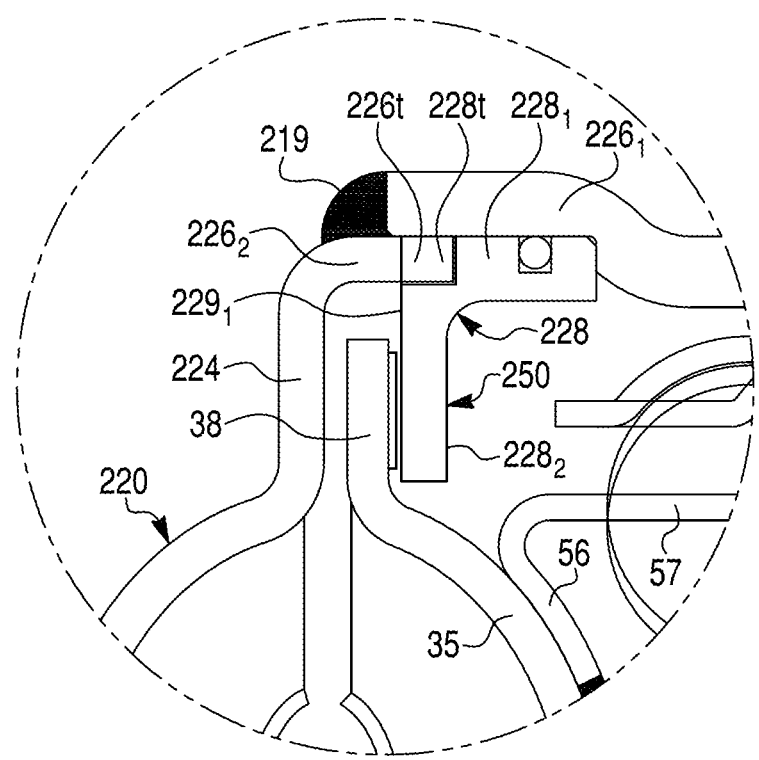
FIG. 12 is an enlarged view of a fragment of the hydrokinetic torque coupling device shown in the circle "12" of FIG. 11.
Figure 13:
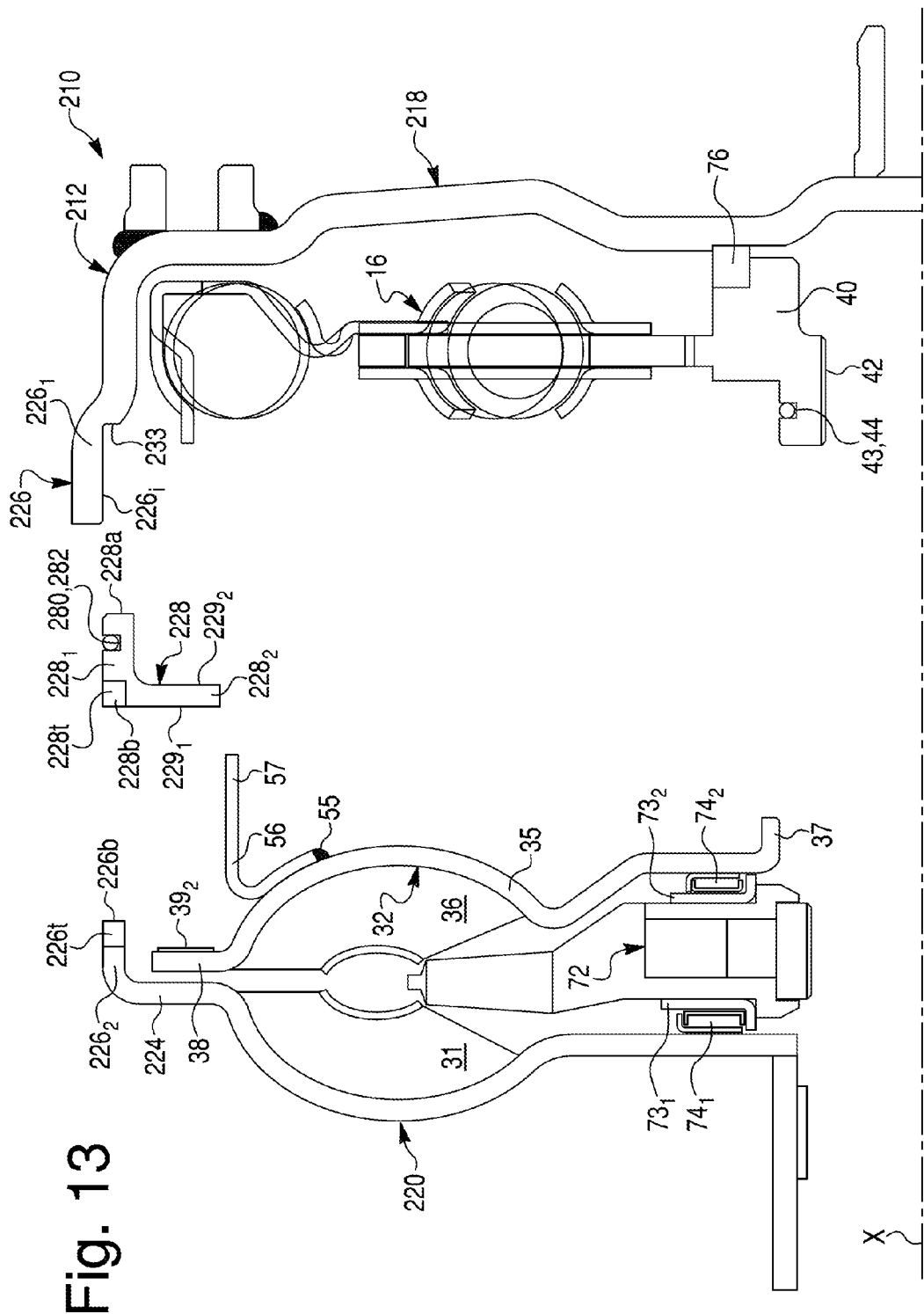
FIG. 13 is an exploded fragmented cross-sectional view of the hydrokinetic torque coupling device of FIG. 11.

In a hydrokinetic torque coupling device 210 of a third exemplary embodiment illustrated in FIGS. 11-13, the annular piston engagement member 128 is replaced by an annular piston engagement member 228 also having an "L"-shaped configuration. In the third exemplary embodiment, the piston engagement member 228 includes an axially extending tubular support portion $228_1$ and a substantially radially extending annular flange portion $228_2$ formed integrally with and extending substantially radially inwardly from the tubular support portion $228_1$. The support portion $228_1$ and the flange portion $228_2$ of the piston engagement member 228 are illustrated integral with one another, e.g., made of a single or unitary piece, but alternatively may be separate pieces connected together. As best shown in FIG. 13, the flange portion $228_2$ of the piston engagement member 228 includes a first engagement surface $229_1$ and a second surface $229_2$ opposite to the first engagement surface $229_1$. The flange portion $228_2$ of the piston engagement member 228 extends radially inwardly from a second axial end 228b of the tubular support portion $228_1$ of the piston engagement member 228.

The piston engagement member 228 is mounted to a casing 212 by non-rotatably engaging the piston engagement member 228 to a second casing shell 220 of the casing 212. Specifically, the second axial end 228b of the support portion $228_1$ of the piston engagement member 228 is formed with axially extending teeth 228t, as best shown in FIGS. 12 and 13. Similarly, a second axial end 226b of a second outer wall portion $226_2$ of the second casing shell 220 is formed with teeth 226t, which are complementary to and face the teeth 228t of the piston engagement member 228, as best shown in FIGS. 12 and 13.

In an assembled state, as best shown in FIGS. 11 and 12, the teeth 228t of the piston engagement member 228 intermesh with (or alternatingly engage) the teeth 226t of the casing 212 so that the piston engagement member 228, including the flange portion $228_2$, is non-rotatably mounted to the casing 212. In other words, the piston engagement member 228 is splined with or keyed to the casing 212 so as to be non-rotatable relative to the casing 212.

Furthermore, the piston engagement member 228 is axially secured to the casing 212 to ensure engagement of a lockup clutch 250. In order to retain the first engagement surface $229_1$ of the piston engagement member 228 axially relative to a first outer wall portion $226_1$ of the casing 212, an inner peripheral surface 226i of an annular outer wall 226 of the casing 212 is provided with an axial stop member 233 in the form of a substantially annular shoulder, so that the inner peripheral surface 226i of the annular outer wall 226 has a step extending radially inwardly, as best shown in FIG. 13. As further illustrated in FIGS. 11 and 12, a first axial end 228a of the support portion $228_1$ of the piston engagement member 228 axially engages (juxtaposed to) the stop member 233 of the casing 212.

A radially outer surface of the support portion $228_1$ of the piston engagement member 228 includes an annular slot 280 for receiving a sealing member, such as an O-ring 282. The sealing member (e.g., O-ring) 282 creates a seal at the interface of the casing 212 and the piston engagement member 228.

The above arrangements and connections, particularly the intermeshing teeth 226t, 228t, allow the piston engagement member 228 to be attached non-rotatably relative to the casing 212 without direct bonding, welding, of fastening of the piston engagement member 228 to the first or second outer wall portions $226_1$, $226_2$. Further, the stop member 233 of the casing 212 assists in axially positioning the piston engagement member 228. These features greatly simplify assembly of the hydrokinetic torque coupling device 210 and insure proper engagement of lockup clutch 250.

The features of the above-described embodiments may be practice with one another and are substitutable with one another in numerous combinations.

Figure 3:
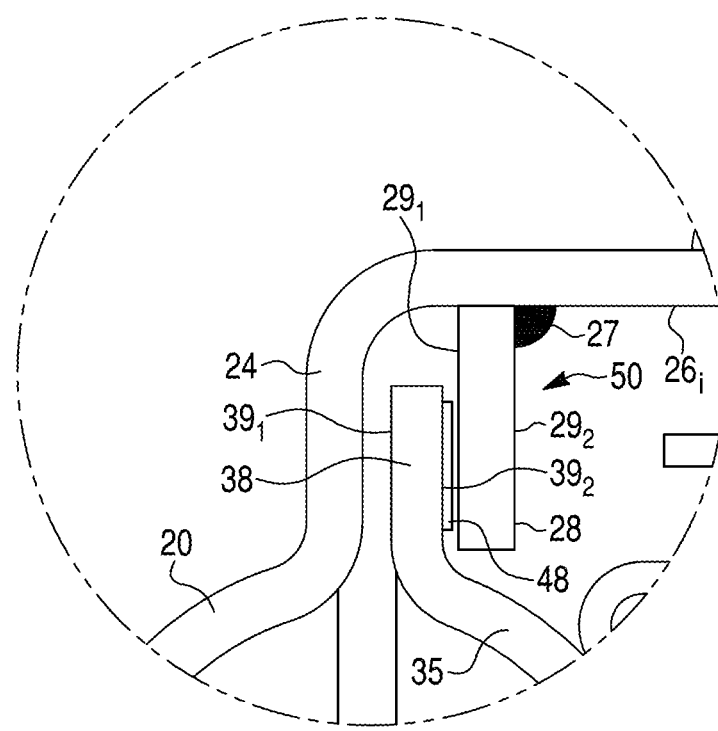
FIG. 3 is an enlarged view of a fragment of the hydrokinetic torque coupling device shown in the circle "3" of FIG. 1.

An exemplary method for assembling the hydrokinetic torque coupling device 10 according to the embodiment of FIGS. 1-3 will now be explained. While the method for assembling the hydrokinetic torque coupling device 10 may be practiced by sequentially performing the steps as set forth below, it should be understood that the method may involve performing the steps in different sequences. It should also be understood that this exemplary method may be practiced in connection with the other embodiments described herein. The exemplary methods described herein are not the exclusive methods for assembling the hydrokinetic torque coupling devices described herein.

The impeller 30, the turbine-piston 32, the stator 34, and the damper 16 may each be preassembled. The turbine-piston 32 includes, as noted above, the turbine-piston shell 35, the turbine blades 36 attached to the turbine-piston shell 35, and the annular, planar turbine-piston flange 38 extending radially outwardly from the turbine-piston shell 35.

The impeller 30, the stator 34, and the turbine-piston 32 subassemblies are assembled together. The piston engagement member 28 is placed in the second casing shell 20 on an opposite side of the turbine-piston flange 38 relative to the second sidewall portion 24, i.e. behind the turbine-piston 32. The piston engagement member 28 is non-moveably secured, such as by welding at the weld 27, to the inner peripheral surface 26i of the outer wall portion $26_2$ of the second casing shell 20 so that the second engagement surface $39_2$ of the turbine-piston flange 38 faces the first engagement surface $29_1$ of the piston engagement member 28 and is situated between the second sidewall portion 22 of the second casing shell 20 and the piston engagement member 28. The drive member 56 is welded to the turbine-piston shell 35 at the weld 55. Alternatively, the drive member 56 may be pre-attached to the turbine-piston shell 35 or formed integrally with the turbine-piston shell 35. The torsional vibration damper 16, optionally preassembled, is installed so that the drive member 56 engages the damper assembly 16 as described above. The cylindrical flange 37 of the turbine-piston 32 is mounted to slidingly engage the output hub 40 through the seal 44. The driven member 62 of the torsional vibration damper 16 is fixedly secured, such as by welding and/or using splines, to the output hub 40. The first casing shell 18 is non-moveably and sealingly secured, such as by welding at 19, to the second casing shell 20, as best shown in FIG. 1.

An exemplary method for assembling the hydrokinetic torque coupling device 110 according to the second embodiment of FIGS. 4-10 will now be explained. While the method for assembling the hydrokinetic torque coupling device 110 may be practiced by sequentially performing the steps as set forth below, it should be understood that the method may involve performing the steps in different sequences. It should also be understood that this exemplary method may be practiced in connection with the other embodiments described herein. The exemplary methods described herein are not the exclusive methods for assembling the hydrokinetic torque coupling devices described herein.

The impeller 130, the turbine-piston 32, the stator 34, and the damper 16 may each be preassembled. The impeller 130, the stator 34, and the turbine-piston 32 subassemblies are assembled together. The piston engagement member 128 is placed within the second casing shell 120 on an opposite side of the turbine-piston flange 38 relative to the second sidewall portion 124, behind the turbine-piston 32. The drive member 56 is welded to the turbine-piston shell 35 at the weld 55. The torsional vibration damper 16, optionally pre-assembled, is added so that the drive member 56 engages the damper assembly 16 as described above. The cylindrical flange 37 of the turbine-piston 32 is mounted to slidingly engage the output hub 40 through the seal 44. The driven member 62 of the torsional vibration damper 16 is fixedly secured, such as by welding and/or using splines, to the output hub 40. The teeth 126t, 128t are intermeshed as described above to connect the piston engagement member 128 to the first casing shell 118. As the first casing shell 118 is mounted to the second casing shell 120, the piston engagement member 128 is slid along the inner surface of the second outer wall portion $126_2$ so that the second axial end 128b of the piston engagement member 128 axially engages the stop member 133 of the casing 112. Alternatively, the piston engagement member 128 and the second casing shell 120 may be assembled together so that the second axial end 128b engages the stop member 133, then the first casing shell 118 may be attached to the piston engagement member 128 so that the teeth 126t, 128t intermesh. The first and second casing shells 118, 120 are non-moveably and sealingly secured to each other, such as by welding at 119.

An exemplary method for assembling the hydrokinetic torque coupling device 210 according to the third embodiment of FIGS. 11-13 will now be explained. While the method for assembling the hydrokinetic torque coupling device 210 may be practiced by sequentially performing the steps as set forth below, it should be understood that the method may involve performing the steps in different sequences. It should also be understood that this exemplary method may be practiced in connection with the other embodiments described herein. The exemplary methods described herein are not the exclusive methods for assembling the hydrokinetic torque coupling devices described herein.

The impeller 230, the turbine-piston 32, the stator 34, and the damper 16 may each be preassembled. The impeller 230, the stator 34, and the turbine-piston 32 subassemblies are assembled together. The piston engagement member 228 is placed within the second casing shell 220 behind the turbine-piston 32 so that the teeth 228t of the piston engagement member 228 alternatingly engage (intermesh with) the teeth 226t of the second casing shell 220. The drive member 56 is welded to the turbine-piston shell 35 at the weld 55. Alternatively, the drive member 56 may be pre-welded to or formed integrally with the turbine-piston shell 35. The pre-assembled torsional vibration damper 16 is added so that the drive member 56 engages the damper assembly 16 as described above. The cylindrical flange 37 of the turbine-piston 32 is mounted to slidingly engage the output hub 40 through the seal 44. The driven member 62 of the torsional vibration damper 16 is fixedly secured, such as by welding and/or using splines, to the output hub 40. The first casing shell 218 is mounted to the second casing shell 120 so that the first axial end 228a of the piston engagement member 228 axially engages the stop member 233 of the first casing shell 218, as best shown in FIG. 11. The first and second casing shells 218, 220 are non-moveably and sealingly secured to each other, such as by welding at 219.

Figure 14:
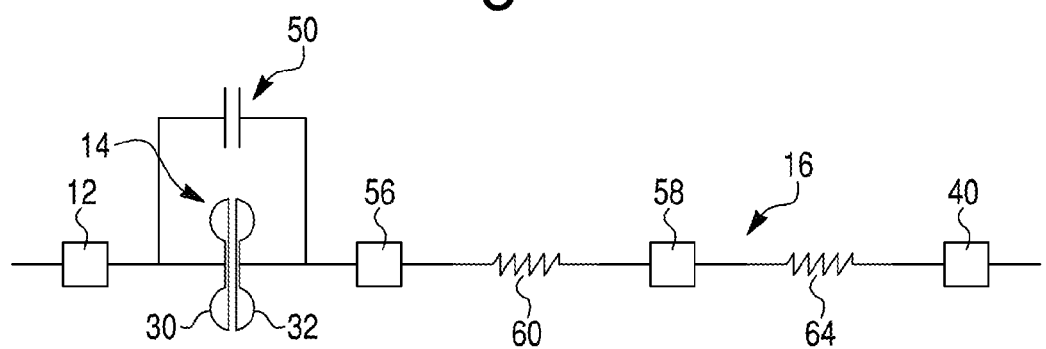
FIG. 14 is a simplified diagram of a hydrodynamic torque coupling device including a turbine-piston with a dual or double damper assembly.

The torque converters and hydrodynamic torque coupling devices described herein may incorporate different damper assemblies. For example, FIG. 14 shows a hydrodynamic torque coupling devices including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 14. The diagram of FIG. 14 generally corresponds to the arrangement of the embodiments shown in FIGS. 1-13.

Figure 15:
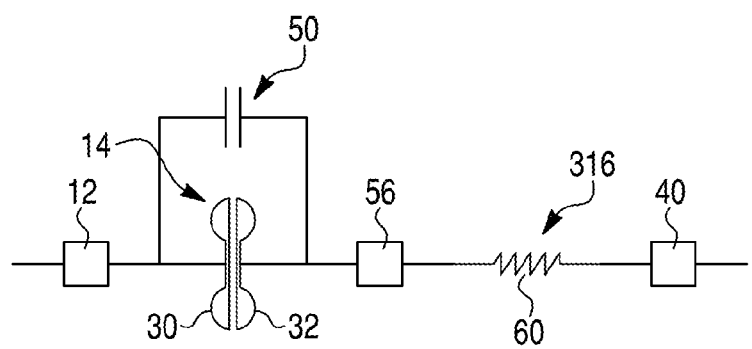
FIG. 15 is a simplified diagram of another hydrodynamic torque coupling device including a turbine-piston with a single damper assembly.

FIG. 15 shows an alternative damper assembly 316 similar to that of FIG. 14, but in which the damper assembly 16 is modified to include only one set of circumferentially extending elastic damping members 60.

Figure 16:
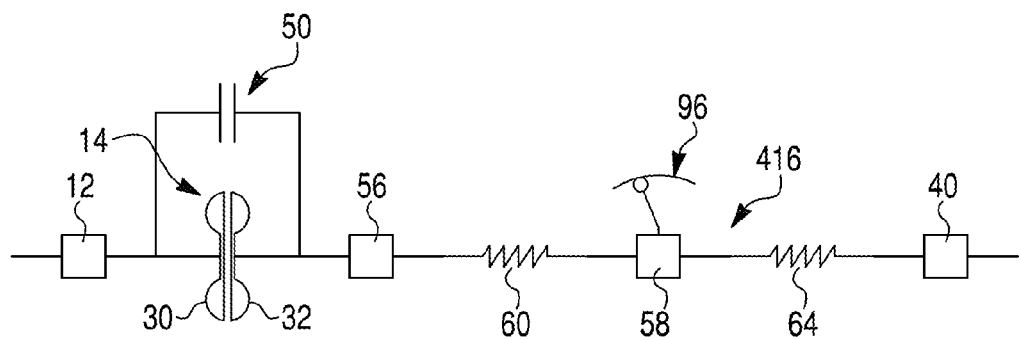
FIG. 16 is a simplified diagram of still another hydrodynamic torque coupling device including a turbine-piston with dual or double damper assemblies and a pendulum vibration absorber.

A damper assembly 416 shown in FIG. 16 is similar to that of FIG. 14, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 17:
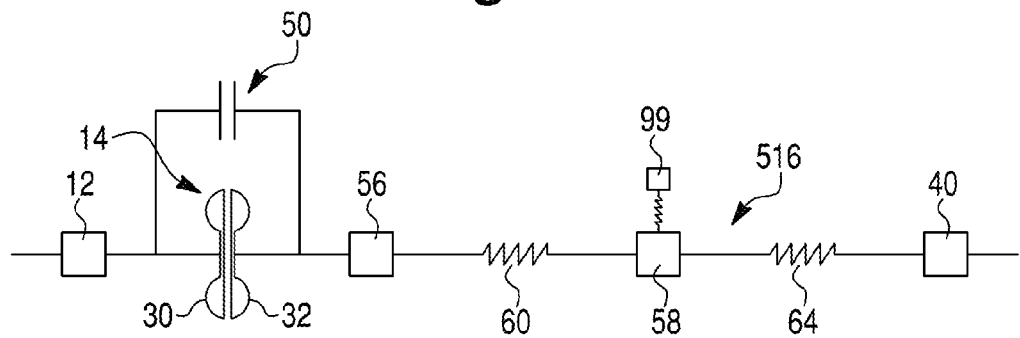
FIG. 17 is a simplified diagram of a further hydrodynamic torque coupling device including a turbine-piston with dual or double damper assemblies and a vibration absorbing spring-mass system.

A damper assembly 516 shown in FIG. 17 is similar to that of FIG. 14, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described, embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling a driving shaft and a driven shaft together, comprising:

a casing rotatable about a rotational axis and comprising opposite first and second sidewalls, the casing further comprising an outer wall extending between and interconnecting the opposite sidewalls;

an impeller coaxially aligned with the rotational axis and comprising an impeller shell;

a piston engagement member extending substantially radially inward from and non-rotatable relative to the outer wall of the casing and being spaced between the opposite sidewalls of the casing, the piston engagement member having a first engagement surface; and a turbine-piston coaxially aligned with and hydrodynamically drivable by the impeller, the turbine-piston comprising a turbine-piston shell including a turbine-piston flange having a second engagement surface axially movable toward and away from the first engagement surface of the piston engagement member to position the hydrokinetic torque coupling device into and out of a lockup mode in which the turbine-piston is mechanically locked to and non-rotatable relative to the piston engagement member.

2. The hydrokinetic torque coupling device of claim 1, wherein the impeller shell establishes the second sidewall of the casing.

3. The hydrokinetic torque coupling device of claim 2, wherein the turbine-piston flange is situated axially between the piston engagement member and the impeller shell.

4. The hydrokinetic torque coupling device of claim 1, wherein the turbine-piston is axially movable towards an input side of the hydrokinetic torque coupling device in order to frictionally couple the first and second engagement surfaces and position the hydrokinetic torque coupling device in the lockup mode, and wherein the turbine-piston is axially movable towards an output side of the hydrokinetic torque coupling device so that the first and second engagement surfaces are not frictionally coupled and the hydrokinetic torque coupling device is not in the lockup mode.

5. The hydrokinetic torque coupling device of claim 4, wherein the impeller shell establishes the second sidewall of the casing on the output side of the hydrokinetic torque coupling device.

6. The hydrokinetic torque coupling device of claim 1, further comprising:
an output hub; and
a damper assembly interconnecting the turbine-piston and the output hub.

7. The hydrokinetic torque coupling device of claim 6, further comprising a drive member interconnecting the turbine-piston shell to the damper assembly, the drive member being axially and rotatably fixed relative to the turbine-piston shell and axially movable with the turbine-piston relative to the damper assembly.

8. The hydrokinetic torque coupling device of claim 6, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

9. The hydrokinetic torque coupling device of claim 6, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

10. The hydrokinetic torque coupling device of claim 6, wherein the turbine-piston shell partitions an interior volume of the hydrokinetic torque coupling device into a torus chamber and a damper chamber, the torus chamber containing impeller blades of the impeller and turbine blades of the turbine-piston, the damper chamber containing the damper assembly.

11. The hydrokinetic torque coupling device of claim 1, wherein the piston engagement member is welded to and extends radially inward from an inner peripheral surface of the outer wall of the casing.

12. The hydrokinetic torque coupling device of claim 1, wherein the impeller shell forms the second sidewall of the casing on an output side of the hydrokinetic torque coupling device, and wherein the piston engagement member is welded to and extends radially inward from an inner peripheral surface of the outer wall of the casing.

13. A hydrokinetic torque coupling device for coupling a driving shaft and a driven shaft together, comprising:
a casing rotatable about a rotational axis and comprising opposite first and second casing shells respectively defining first and second sidewalls, the casing comprising an outer wall extending between and interconnecting the opposite sidewalls, the casing comprising first teeth;
an impeller coaxially aligned with the rotational axis and comprising an impeller shell;
a piston engagement member extending substantially radially inward from and non-rotatable relative to the outer wall of the casing and being spaced between the opposite sidewalls of the casing, the piston engagement member having a first engagement surface and comprising second teeth intermeshed with the first teeth; and
a turbine-piston coaxially aligned with and hydrodynamically drivable by the impeller, the turbine-piston comprising a turbine-piston shell including a turbine-piston flange having a second engagement surface axially movable toward and away from the first engagement surface of the piston engagement member to position the hydrokinetic torque coupling device into and out of a lockup mode in which the turbine-piston is mechanically locked to and non-rotatable relative to the piston engagement member.

14. The hydrokinetic torque coupling device of claim 13, wherein the piston engagement member comprises a support portion and a flange portion extending substantially radially inward from the support portion.

15. The hydrokinetic torque coupling device of claim 14, wherein the support portion has first and second ends, the second end including the second teeth.

16. The hydrokinetic torque coupling device of claim 15, wherein the casing includes an axial stop member engaging the first end of the support portion for preventing axial movement of the piston engagement member relative to the casing.

17. The hydrokinetic torque coupling device of claim 15, further comprising a sealing member between an outer peripheral surface of the support portion and a radially inner peripheral surface of the casing.

18. The hydrokinetic torque coupling device of claim 15, wherein the impeller shell and the second casing shell are the same, and wherein the impeller shell includes the first teeth.

19. The hydrokinetic torque coupling device of claim 15, wherein the impeller shell and the second casing shell are the same, and wherein the first casing shell includes the first teeth.

20. A method of assembling a hydrokinetic torque coupling device for coupling a driving shaft and a driven shaft together, comprising:
providing a torque converter having a rotational axis, the torque converter comprising an impeller and an axially movable turbine-piston, the impeller comprising an impeller shell, the turbine-piston comprising a turbine-piston shell including a turbine-piston flange; and
operatively connecting the torque converter with a piston engagement member having a first engagement surface and a casing shell to provide a structure comprising (i) a casing of the hydrokinetic torque coupling device, the casing shell and the impeller shell respectively defining opposite first and second sidewalls of the casing, the casing comprising an outer wall interconnecting the first and second sidewalls, (ii) the piston engagement member extending substantially radially inward from and non-movable relative to the outer wall of the casing, and spaced between the opposite first and second sidewalls of the casing, and (iii) the turbine-piston flange with a second engagement surface movable axially toward and away from the first engagement surface of the piston engagement member to position the hydrokinetic torque coupling device into and out of a lockup mode in which the turbine-piston is mechanically locked to and non-rotatable relative to the piston engagement member.

* * * * *